(12) United States Patent
Sporn

(10) Patent No.: US 7,096,827 B2
(45) Date of Patent: Aug. 29, 2006

(54) COMBINATION TRAINING LEAD AND MULTIPLE ANIMAL LEASH

(76) Inventor: Joseph S. Sporn, 274 W. 86th St., New York, NY (US) 10024

( * ) Notice: Subject to any disclaimer, the term of this patent is extended or adjusted under 35 U.S.C. 154(b) by 0 days.

(21) Appl. No.: 10/916,569

(22) Filed: Aug. 12, 2004

(65) Prior Publication Data

US 2006/0032461 A1     Feb. 16, 2006

(51) Int. Cl.
*A01K 27/00*     (2006.01)
(52) U.S. Cl. .................. 119/797; 119/792; 119/793; 119/795
(58) Field of Classification Search .......... 119/797, 119/795, 771, 769, 772, 770, 790, 774, 792, 119/793, 798, 756, 776, 784, 787, 791, 863, 119/865, 801; 224/184
See application file for complete search history.

(56) References Cited

U.S. PATENT DOCUMENTS

| | | | | |
|---|---|---|---|---|
| 2,861,547 A | * | 11/1958 | Dale | ............... 119/797 |
| 4,638,764 A | * | 1/1987 | Anderson | ............... 119/770 |
| 4,879,972 A | * | 11/1989 | Crowe et al. | ............... 119/792 |
| 5,351,654 A | * | 10/1994 | Fuentes | ............... 119/770 |
| 5,370,286 A | * | 12/1994 | Newman | ............... 224/578 |
| 5,423,644 A | * | 6/1995 | First, Sr. | ............... 410/100 |
| 6,626,132 B1 | * | 9/2003 | Mann | ............... 119/795 |
| 6,662,753 B1 | * | 12/2003 | Sporn | ............... 119/797 |
| 6,971,334 B1 | * | 12/2005 | Livesay et al. | ............... 119/798 |

* cited by examiner

*Primary Examiner*—Teri Pham Luu
*Assistant Examiner*—Joshua Michener
(74) *Attorney, Agent, or Firm*—Richard W. Hanes; Hanes & Schutz, LLC

(57) ABSTRACT

A combination training lead and multiple animal leash comprising, a leash-forming strap having a handle at a first end thereof and having at least two branches at a second end thereof with a snap connector carried by each of the branches and including a D-ring attached to the leash-forming strap, intermediate its first and second ends, and adapted to interconnect with one of the snap connectors to form a second handle.

2 Claims, 1 Drawing Sheet

US 7,096,827 B2

COMBINATION TRAINING LEAD AND MULTIPLE ANIMAL LEASH

FIELD OF THE INVENTION

The present invention relates generally to animal leashes and more specifically to a leash adaptable for use with multiple animals that can be quickly converted into a training lead for one animal.

BACKGROUND OF THE INVENTION

An animal leash is normally used for leading and controlling dogs or other animals and keeping them close to the leader and under his/her control. Such leashes may be designed for one or multiple animals. My U.S. Pat. No. 6,237,539 discloses a multiple dog leash that may be adjusted to accommodate dogs of different sizes.

Training of a dog requires greater control than is usually available through the use of a normal leash. That additional control is achieved through the use of a short lead where the dog, for example, can be reined in to walk closely beside the trainer. A short lead provides for control impulses that can be subtlety and immediately conveyed to the animal. The length of such a lead depends on the physical stature of the trainer and the size of the animal. An ordinary leash can be shortened to serve as a training leash by folding and bunching the excess length, but holding such a collection of leash material and exercising the proper control of the animal is difficult and cumbersome.

Accordingly, it is the primary object of the present invention to provide a leash that will serve its traditional purpose but at the same time be quickly and easily converted to a training leash that permits optimum control of the animal with comfort and convenience to the trainer.

Other objects, features and advantages of the present invention will become apparent upon reading a description of the invention taken in conjunction with the accompanying drawings.

SUMMARY OF THE INVENTION

A leash strap with a handle or trainer grip on the proximal end thereof is provided with a furcated distal end. Each of the branches of the distal strap are equipped with fasteners or connectors adapted to fasten to the collars or harnesses of two or more dogs, providing a traditional multiple dog leash. If only one dog is to be led, the unused furcations can be folded back and their end connectors fastened to a connecting loop that is attached to the strap. This connection prevents the unused branches from dangling beside the animal that is attached to the leash and keeps them out of the way.

Converting the leash to a shortened training lead involves the same step as described for using the leash with a single animal. That is, one of the furcations is folded back and its connecting end is fastened to a nearby connector loop to form a handle within inches of the attachment of the other furcation to the collar or harness of the animal. An adjusting device may also be provided to vary the length of the lead between the attachment to the animal's collar or harness and the newly formed handle.

DETAILED DESCRIPTION OF PREFERRED EMBODIMENT

Figure 1:
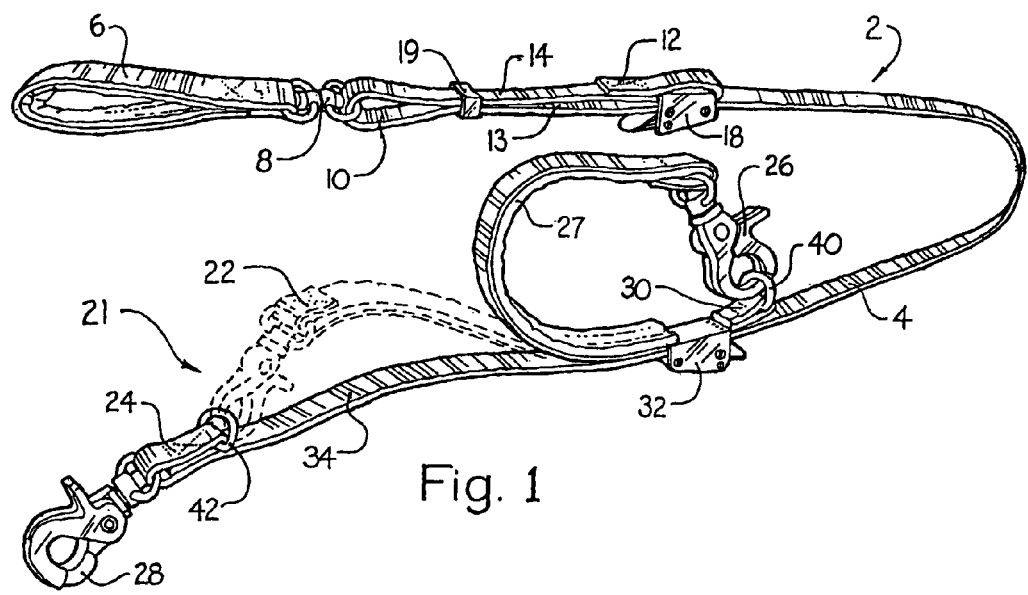
FIG. 1 is a perspective view of a preferred form of the combination training lead and leash of the present invention.

Referring first to FIG. 1, the combination leash and training lead 2 of the present invention is illustrated. The leash comprises an elongated strap 4 made of leather, cloth webbing or other suitable material. A primary handle 6 is attached by metal linkage 8 to a loop 10 formed by the folded over first end 12 of the strap 4. This folded-over end 12 can be sewn or otherwise secured to the under part of the strap 13 if there is no intention to provide adjustability to the length of the strap 4. However, the preferred form of the invention, as shown in FIG. 1, is a structure that accommodates adjustability of the entire strap length. As seen in the illustration of FIG. 1, the folded over end 12 of the strap is made parallel to the adjacent portion 13 of the strap and the two portions are trained through the mechanism of a locking clamp 18. By unlocking the clamp 18 and manually increasing or decreasing the length of the folded over portion 14 of the strap, the overall length of the leash may be varied and then maintained by locking the clamp 18 to hold the end 12 of the strap against that portion of the strap that is also disposed within the locking clamp. A slidable band or ring 19 encloses the facing portion 13 of the strap together with the folded over portion 14 in order to maintain them in close parallel relation to one another. This avoids cumbersome loops or space between the folded over portion 14 and the main portion 13 of the strap.

In the preferred form, the distal end 21 of the leash is bifurcated to form two ends 22 and 24, each with an attached snap connector 26 and 28. Forming the bifurcated distal ends of the leash may be accomplished in several ways, but the preferred method is to add a second elongated strap 27 to the first strap 4. This may be done by training the proximal end 30 of the second strap 27 through a second locking clamp 32 that also embraces an intermediate portion of the first strap 4. When the locking clamp 32 is unlocked the portion 34 of the first strap 4 that is distal to the locking clamp 32 may be lengthened or shortened to provide adjustability to the length of the training lead when converting the device from a typical leash to a training lead.

Figure 2:
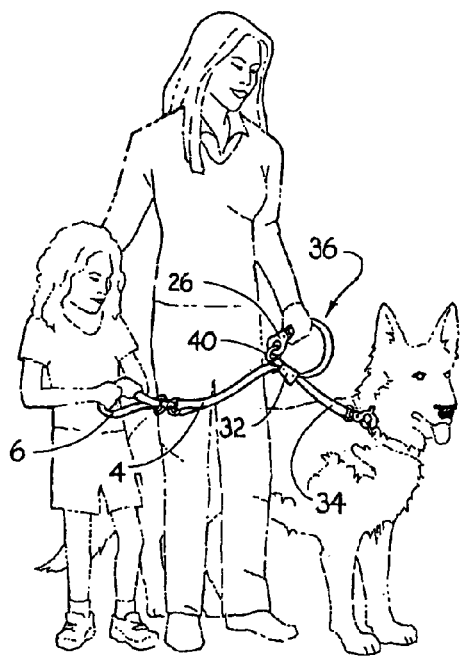
FIG. 2 is a perspective view of a trainer holding the shortened training lead handle with her left hand and a child holding the handle of the longer length portion of the leash.

As seen in FIG. 2, the training control loop handle 36 is formed by folding the free end of the second strap 27 over so that the snap connector 26 may be connected to a D-ring 40 that is sewn or otherwise attached to the proximal end of the second strap 27 near the locking clamp 32. The handle 36 enables a trainer to exert close control over the animal in training with his left hand while managing the excess length of the leash by holding the loop of the primary handle 6 in his right hand. As shown in FIG. 2, the primary handle 6 may be held by a child to provide the child with some experience in holding the leash and controlling the animal.

Figure 3:
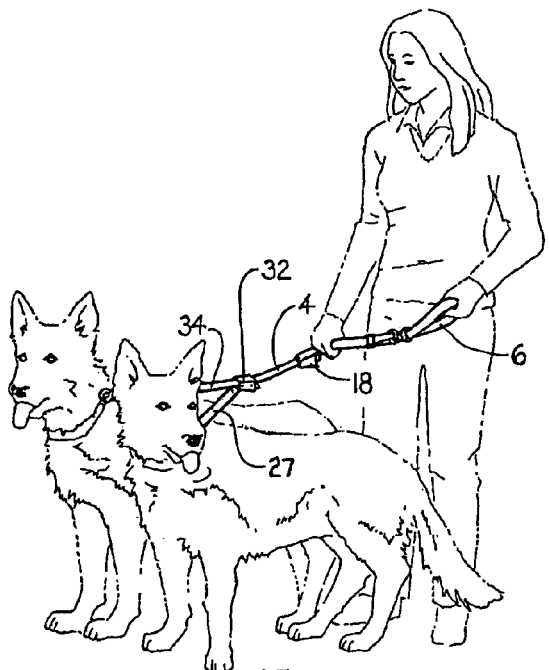
FIG. 3 is a perspective view of a person using the leash of the present invention as a traditional multiple dog leash, leading two dogs.

FIG. 3 illustrates the use of the leash as a multiple dog leash where the distal snap connectors 26 and 28 (shown in FIG. 1) are connected to the collars of two different dogs. In this configuration the second locking clamp 32 can be unlocked and moved to afford adjustment of the length of one of the two bifurcated ends of the leash.

A D-ring type of connector 42 (FIG. 1) may be attached to the distal end 24 of the strap 4 in order to provide a connecting point for the snap connector 26 when the leash 2 is used for a single dog in order to stow the second strap 27 out of the way.

What is claimed is:

1. A combination training lead and multiple animal leash comprising,
    a first elongated monolithic strap having a body and first and second ends, where the first end of the strap is folded over onto the body of the first strap to form a loop,
    handle means attached to the loop,
    a length-adjusting locking clamp carried by the said first end of the first strap and the body of the first strap,
    a second elongated strap having first and second ends,
    a second locking clamp carried by the first end of the second elongated strap and the body of the first elongated strap and disposed between the second end of the first strap and the length-adjusting locking clamp,
    a connector loop attached to the first end of the second strap, and
    connector means attached to the second ends of each of the first and second elongated straps.

2. The apparatus of claim 1 and further including a band enclosing the folded end of the first elongated strap and the body of the first strap, said band located intermediate the loop and the length-adjusting locking clamp.

* * * * *